United States Patent Office 3,168,574
Patented Feb. 2, 1965

3,168,574
ISOMERIZATION OF BIS(HYDROCARBON OR SUB-
STITUTED ARYLTHIO)ETHYLENE
Jack Hensel, Leewood, Kans., assignor to Chemagro Corporation, New York, N.Y., a corporation of New York
No Drawing. Filed July 14, 1960, Ser. No. 42,760
4 Claims. (Cl. 260—609)

This invention relates to the conversion of cis bis organothio ethylenes and haloethylenes to the corresponding trans bis organothio ethylenes and haloethylenes.

Bis organosulfonyl ethylenes and haloethylenes have been found to be good fungicides, Johnston Belgian Patent 543,377, June 6, 1956, Raasch United States Patent 2,893,911 and Riden Belgian Patent 567,981, June 14, 1958.

The trans isomer has been found in many cases to be superior to the cis isomer. Unfortunately, the normal procedures for preparing the bis organosulfonyl ethylenes and haloethylenes either prepare the cis isomer or a mixture of cis and trans isomers containing a large proportion of the cis isomer.

Likewise, the normal procedures for preparing bis organothio ethylenes and haloethylenes also form the cis isomer rather than the trans isomer. This is unfortunate in that the customary procedure for preparing the bis organosulfonyl ethylenes and haloethylenes depends upon the oxidation of the corresponding thio compound.

It is an object of the present invention to convert cis bis organothio ethylenes and haloethylenes to the corresponding trans compounds.

Another object is to convert cis bis alkylthio ethylenes to the corresponding trans compounds.

A more specific object is to convert cis bis n-propylthio-ethylene to trans n-propylthioethylene.

A further object is to devise a new procedure for obtaining trans bis organosulfonyl ethylenes and haloethylenes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by heating a cis bis organothio ethylene or haloethylene to a temperature of at least 125° C. for at least 6 hours or to a temperature of at least 150° C. for at least ½ hour. The temperature can be as high as the boiling point of the organothio compound. In general, the lower the temperature, the longer the time required for conversion. For example, at 125° C. it takes 6 hours to convert 10% of pure cis 1,2-bis (n-propylthio) ethylene to trans 1,2-bis (n-propylthio) ethylene. At 150° C., 75% of the same cis compound is converted to the trans compound in 6 hours. At 150° C. 100% of the cis bis (n-propylthio) ethylene was converted to the trans isomer in 12 hours.

The results obtained are unexpected since when an attempt was made to isomerize cis-1,2-bis (n-propylsulfonyl) ethylene to trans 1,2-bis-(n-propylsulfonyl) ethylene by heating at 150° C. for 28 hours there was recovered the unchanged cis isomer. Likewise, when an attempt was made to isomerize cis-1,2-bis (n-propylthio) ethylene to trans-1,2-bis (n-propylthio) ethylene using bromine in carbon tetrachloride and irradiating the mixture with ultraviolent light resulted in the recovery of unchanged cis-1,2-bis-(n-propylthio) ethylene.

Attempts to isomerize cis-1,2-bis (propylthio) ethylene to trans-1,2-bis (propylthio) ethylene using well known isomerization catalysts such as stainless steel, sulfuric acid, potassium hydroxide, zinc chloride, copper powder, iodine and phosphorus pentasulfide were not successful.

The process is preferably carried out at atmospheric pressure since at reduced pressures the cis organothio compounds have a tendency to boil at too low a temperature.

As the starting cis organothio ethylenes and haloethylenes there can be employed compounds having the formula

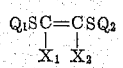

where $Q_1$ and $Q_2$ are selected from the group consisting of alkyl having 1 to 18 carbon atoms, phenyl, lower alkylphenyl, benzyl, chlorophenyl, bromophenyl, nitrophenyl and naphthyl and $X_1$ and $X_2$ are selected from the group consisting of hydrogen and halogen. Preferably, $Q_1$ and $Q_2$ are both alkyl groups of 2 to 5 carbon atoms and preferably both $X_1$ and $X_2$ are hydrogen.

As typical examples of cis organothioethylenes and haloethylenes which can be converted to the corresponding trans isomers, there can be used 1,2-bis (methylthio) ethylene; 1,2-bis (ethylthio) ethylene; 1,2-bis (n-propylthio) ethylene; 1,2-bis (isopropylthio) ethylene; 1,2-bis (n-butylthio) ethylene; 1,2-bis (isobutylthio) ethylene; 1,2-bis (sec. butylthio) ethylene; 1,2-bis (t. butylthio) ethylene; 1,2-bis (amylthio) ethylene; 1,2-bis (hexylthio) ethylene; 1,2-bis (heptylthio) ethylene; 1,2-bis (octylthio) ethylene; 1,2-bis (nonylthio) ethylene; 1,2-bis (decylthio) ethylene; 1,2-bis (dodecylthio) ethylene; 1,2-bis (octadecylthio) ethylene; 1,2-bis (benzylthio) ethylene; 1,2-bis (phenylthio) ethylene; 1,2-bis (o-tolylthio) ethylene; 1,2-bis (m-tolylthio) ethylene; 1,2-bis (p-tolylthio) ethylene; 1,2-bis (2-naphthylthio) ethylene; 1,2-bis (o-nitrophenylthio) ethylene; 1,2-bis (p-nitrophenylthio) ethylene; 1,2-bis (m-nitrophenylthio) ethylene; 1,2-bis (o-chlorophenylthio) ethylene; 1,2-bis (p-chlorophenylthio) ethylene ; 1,2-bis (m-chlorophenylthio) ethylene; 1,2-bis (o-bromophenylthio) ethylene; 1,2-bis (ethylthio)-1,2-dichloroethylene; 1,2-bis (methylthio)-1,2-dichloroethylene; 1,2-bis (n-propylthio)-1,2-dichloroethylene; 1,2-bis (n-propylthio)-1,2-dibromoethylene; 1,2-bis (n-propylthio)-1,2-difluoroethylene; 1,2-bis (n-propylthio)-1,2-diiodoethylene; 1,2-bis (isopropylthio)-1,2-dichloroethylene; 1,2-bis (n-butylthio)-1,2-dichloroethylene; 1,2-bis (ethylthio)-1-chloro-2-fluoroethylene; 1-(methylthio)-2-(ethylthio)-1,2-dichloroethylene; 1-(n-propylthio)-2-(n-butylthio) ethylene; 1,2-bis (dodecylthio)-1,2-dichloroethylene; 1,2-bis (methylthio)-1-chloroethylene; 1,2-bis (ethylthio)-1-chloroethylene; 1,2-bis (n-propylthio)-1-chloroethylene; 1,2-bis (n-propylthio)-1-bromoethylene; 1,2-bis (n-propylthio)-1-fluoroethylene; 1,2-bis (isopropylthio)-1-chloroethylene; 1,2-bis (n-butylthio) - 1 - chloroethylene; 1,2-bis (isobutylthio)-1-chloroethylene; 1,2-bis (sec. butylthio)-1-chloroethylene; 1,2-bis (t. butylthio)-1-chloroethylene; 1-methylthio-2-butylthio-1-chloroethylene; 1-propylthio-2-butylthio ethylene; 1,2-bis (octylthio)-1-chloroethylene; and 1,2-bis (octadecylthio)-1-chloroethylene.

In the specification and claims all parts and percentages are by weight unless otherwise indicated.

Example 1

Ten grams of cis 1,2-bis (n-propylthio) ethylene were heated for 28 hours at 150° C. At the end of this time the product had converted entirely to the trans isomer of bis-1,2-(n-propylthio) ethylene as shown by infra-red analysis.

Example 2

Nine grams of the product obtained in Example 1 were dissolved in 5.4 ml. glacial acetic acid and 5.4 ml. of water and treated with 25.6 ml. of 30% aqueous hydrogen peroxide at 85° C. for two hours, including one-half hour for addition of the hydrogen peroxide.

After the cooking, the reaction mixture was cooled to room temperature and the product filtered. After drying, the trans-1,2-bis (n-propylsulfonyl) ethylene having a melting point of 148–149° C. was recovered in a yield of 5 grams. A portion of this material when mixed with an authentic sample of trans-1,2-bis (n-propylsulfonyl) ethylene gave only a slight mixed melting point depression. (Pure trans-1,2-bis (n-propylsulfonyl) ethylene has a melting point of 155–156° C.)

The fact that the trans bis sufonyl ethylene is recovered in this example is further evidence that isomerization occurs in the heating of the cis-1,2-bis (n-propylthio) ethylene since cis-1,2-bis (n-propylsulfonyl) ethylene cannot be converted to the trans isomer simply by heating.

The amount of cis bis sulfonyl isomer obtained in the instant example was too small to determine analytically. The reason for the low yield of trans isomer was due to splitting of the molecule during the oxidation step.

What is claimed is:

1. The method of converting the cis isomer of a bis lower alkylthio ethylene having the formula: lower alkyl —S—CH=CH—S— lower alkyl to the trans isomer consisting of heating said cis isomer to between 125° C. and the boiling point of the cis isomer until at least 75% of the cis isomer present is converted to the trans isomer.

2. A process according to claim 1 wherein the heating is carried out at atmospheric pressure.

3. A process of converting cis bis (n-propylthio)ethylene to trans bis (n-propylthio) ethylene consisting of heating at atmospheric pressure said cis isomer to between 125° C. and the boiling point of the cis isomer until at least 75% of this cis isomer present is converted to the trans isomer.

4. A process of converting cis bis (n-propylthio) ethylene to trans bis (n-propylthio) ethylene consisting of heating said cis isomer to 150° C. for 12 hours at atmospheric pressure until at least 75% of the cis isomer present is converted to the trans isomer.

References Cited by the Examiner
UNITED STATES PATENTS

| | | | |
|---|---|---|---|
| 2,141,066 | 1/47 | Scott | 260—405.6 |
| 2,893,911 | 7/59 | Raasch | 260—607 |
| 2,979,445 | 4/61 | Lavigne et al. | 260—405.6 |
| 2,983,762 | 5/61 | Gerjovich | 260—609 |

OTHER REFERENCES

Bailey: Industrial Fat and Oil Products (2nd edition), pages 71 (1951), Interscience Publishers Inc., New York, N.Y.

Bertram: Oil and Color Trades Journal, 1227–1229 (Oct. 28, 1938).

Desnelle et al.: Bull. Soc. Chim., 12, 998–1001 (1945), cited in Chem. Abs., 40, 3722 (1946).

Egloff: Isomerization of Pure Hydrocarbons, pages 41–58.

CHARLES B. PARKER, *Primary Examiner.*
ABRAHAM H. WINKELSTEIN, *Examiner.*